US012112401B2

(12) United States Patent
Baek (10) Patent No.: US 12,112,401 B2
(45) Date of Patent: Oct. 8, 2024

(54) APPARATUS FOR SELECTING VIDEO CONTENT FOR AUGMENTED REALITY AND USER TERMINAL FOR AUGMENTED REALITY

(71) Applicant: Jinwook Baek, Seoul (KR)

(72) Inventor: Jinwook Baek, Seoul (KR)

( * ) Notice: Subject to any disclaimer, the term of this patent is extended or adjusted under 35 U.S.C. 154(b) by 158 days.

(21) Appl. No.: 17/884,373

(22) Filed: Aug. 9, 2022

(65) Prior Publication Data

US 2023/0051112 A1    Feb. 16, 2023

(30) Foreign Application Priority Data

Aug. 13, 2021    (KR) .......................... 10-2021-0107037

(51) Int. Cl.
*G06T 11/00* (2006.01)
*G06F 16/71* (2019.01)
(Continued)

(52) U.S. Cl.
CPC .............. *G06T 11/00* (2013.01); *G06F 16/71* (2019.01); *G06F 16/7837* (2019.01);
(Continued)

(58) Field of Classification Search
CPC ........ G06T 11/00; G06T 11/60; G06T 19/006
See application file for complete search history.

(56) References Cited

U.S. PATENT DOCUMENTS

| | | | | |
|---|---|---|---|---|
| 2013/0297460 A1* | 11/2013 | Spivack | ............. | G06Q 30/0643 705/27.2 |
| 2014/0172296 A1* | 6/2014 | Shtukater | ........... | G01C 21/3647 701/408 |

(Continued)

FOREIGN PATENT DOCUMENTS

| | | |
|---|---|---|
| KR | 10-2013-0098470 A | 9/2013 |
| KR | 10-2014-0071086 A | 6/2014 |

(Continued)

OTHER PUBLICATIONS

Zhang et al., CloudAR: A Cloud-based Framework for Mobile Augmented Reality, Thematic Workshops '17, Oct. 2017, pp. 194-200 (Year: 2017).*

(Continued)

*Primary Examiner* — Charles Tseng
(74) *Attorney, Agent, or Firm* — Stein IP, LLC (57) ABSTRACT

A video content selecting apparatus for augmented reality is provided. The apparatus includes a communication interface; and an operation processor configured to perform: (a) collect a plurality of video contents through the Internet; (b) extract feature information and metadata for each of the plurality of video contents, and generate a hash value corresponding to the feature information by using a predetermined hashing function; (c) manage a database to include at least the hash value and the metadata of each of the plurality of video contents; (d) receive object information corresponding to an object in a real-world environment from a user terminal through the communication interface; (e) search the database based on the object information and select a video content corresponding to the object information from among the plurality of video contents; and (f) transmit the metadata of the selected video content to the user terminal through the communication interface.

14 Claims, 6 Drawing Sheets

(51) Int. Cl.
  *G06F 16/783* (2019.01)
  *G06V 20/20* (2022.01)
  *G06V 20/40* (2022.01)

(52) U.S. Cl.
  CPC .............. *G06V 20/20* (2022.01); *G06V 20/46* (2022.01); *G06T 2210/61* (2013.01); *G06V 2201/10* (2022.01)

(56) References Cited

U.S. PATENT DOCUMENTS

| | | | | |
|---|---|---|---|---|
| 2015/0332502 | A1* | 11/2015 | Seen | H04N 9/3141 345/633 |
| 2017/0084082 | A1* | 3/2017 | McTaggart | H04L 67/04 |
| 2018/0033208 | A1* | 2/2018 | Martin | H04N 1/00244 |

FOREIGN PATENT DOCUMENTS

| | | |
|---|---|---|
| KR | 10-2015-0093536 A | 8/2015 |
| KR | 10-2017-0090392 A | 8/2017 |
| KR | 10-2020-0077049 A | 6/2020 |

OTHER PUBLICATIONS

Xin et al., Large Visual Repository Search with Hash Collison Design Optimization, IEEE Multimedia, vol. 20, Issue 2, Apr.-Jun. 2013, pp. 62-71 (Year: 2013).*

Office Action dated Aug. 16, 2023, issued to Korean Patent Application No. 10-2021-0107037.

* cited by examiner

| HASH VALUE #1 | METADATA OF VIDEO CONTENT #1 | THE NUMBER OF VIEWS OF VIDEO CONTENT #1 | THE DEGREE OF PREFERENCES OF VIDEO CONTENT #1 |
|---|---|---|---|
| ... | METADATA OF VIDEO CONTENT #1 | THE NUMBER OF VIEWS OF VIDEO CONTENT #1 | THE DEGREE OF PREFERENCES OF VIDEO CONTENT #1 |
| HASH VALUE #100 | METADATA OF VIDEO CONTENT #1 | THE NUMBER OF VIEWS OF VIDEO CONTENT #1 | THE DEGREE OF PREFERENCES OF VIDEO CONTENT #1 |
| HASH VALUE #101 | METADATA OF VIDEO CONTENT #2 | THE NUMBER OF VIEWS OF VIDEO CONTENT #2 | THE DEGREE OF PREFERENCES OF VIDEO CONTENT #2 |
| ... | METADATA OF VIDEO CONTENT #2 | THE NUMBER OF VIEWS OF VIDEO CONTENT #2 | THE DEGREE OF PREFERENCES OF VIDEO CONTENT #2 |
| HASH VALUE #201 | METADATA OF VIDEO CONTENT #3 | HE NUMBER OF VIEWS OF VIDEO CONTENT #3 | THE DEGREE OF PREFERENCES OF VIDEO CONTENT #3 |
| ... | METADATA OF VIDEO CONTENT #3 | HE NUMBER OF VIEWS OF VIDEO CONTENT #3 | THE DEGREE OF PREFERENCES OF VIDEO CONTENT #3 |
| ... | ... | ... | ... |

FIG. 5

P151 — SELECT, AMONG PLURALITY OF VIDEO CONTENTS, VIDEO CONTENT HAVING HASH VALUE THE SAME AS HASH VALUE INCLUDED IN OBJECT INFORMATION

P153 — SELECT, AMONG PLURALITY OF VIDEO CONTENTS, VIDEO CONTENT HAVING REGION INFORMATION CORRESPONDING TO LOCATION INFORMATION INCLUDED IN OBJECT INFORMATION AND HASH VALUE BEING THE SAME AS HASH VALUE INCLUDED IN OBJECT INFORMATION

P155 — IF NONE OF PLURALITY OF VIDEO CONTENTS HAS THE SAME HASH VALUE AS HASH VALUE INCLUDED IN OBJECT INFORMATION, SELECT, AMONG PLURALITY OF VIDEO CONTENTS, VIDEO CONTENT THAT INCLUDES CURRENT TIME CORRESPONDING TO TIME INFORMATION, VIDEO CONTENT THAT INCLUDES REGION INFORMATION CORRESPONDING TO LOCATION INFORMATION INCLUDED IN OBJECT INFORMATION, OR VIDEO CONTENT THAT INCLUDES THE NUMBER OF VIEWS OR THE DEGREE OF PREFERENCES BEING EQUAL TO OR GREATER THAN PRESET VALUE CORRESPONDING THERETO WHILE REGION INFORMATION THEREOF CORRESPONDS TO LOCATION INFORMATION INCLUDED IN OBJECT INFORMATION

P157 — SEARCH DATABASE BASED ON HASH VALUE OF IMAGE OF OBJECT IN REAL-WORLD ENVIRONMENT, WHICH IS GENERATED THROUGH PROCESS P170

P251: DISPLAY REPRESENTATIVE IMAGE BY IMAGE DISPLAY UNIT SUCH THAT REPRESENTATIVE IMAGE INCLUDED IN METADATA IS SUPERIMPOSED ON OBJECT IN REAL-WORLD ENVIRONMENT

P253: ENLARGE REPRESENTATIVE IMAGE AND DISPLAY ENLARGED REPRESENTATIVE IMAGE FOR PRESET TIME PERIOD SO THAT REPRESENTATIVE IMAGE IS SUPERIMPOSED NOT ONLY ON OBJECT IN REAL-WORLD ENVIRONMENT BUT ALSO ON PORTIONS OTHER THAN OBJECT IN REAL-WORLD ENVIRONMENT FOR PRESET TIME PERIOD

APPARATUS FOR SELECTING VIDEO CONTENT FOR AUGMENTED REALITY AND USER TERMINAL FOR AUGMENTED REALITY

CROSS-REFERENCE TO RELATED PATENT APPLICATION

This non-provisional U.S. patent application is based upon and claims priority under 35 U.S.C. § 119 of Korean Patent Application No. 10-2021-0107037, filed on Aug. 13, 2021, in the Korean Intellectual Property Office, the entire contents of which are hereby incorporated by reference.

BACKGROUND

1. Field

The present disclosure relates to an apparatus of selecting a video content for augmented reality, a user terminal, and a method of providing the video content for the augmented reality.

2. Related Art

Augmented reality (AR) is a technology that allows a user to see objects that reside in a real-world environment overlaid with virtual objects. In the augmented reality, for example, virtual objects are overlaid in a real-world environment, so that one image can be displayed to the user. A virtual object includes, for example, information related to a real-world environment (for example, an object that resides in the real-world environment). Compared to virtual reality (VR) that provides only a virtual environment to the user, the augmented reality may provide a better sense of reality to the user.

In order to deliver augmented reality experience, a user terminal such as a smart phone or smart glasses may be used. In the present specification, the smart phone refers to a mobile communication terminal having a computing function of, e.g., a processor. The smart phone has, for example, an image acquisition function of, e.g., a camera and an image display function of, e.g., a display and may provide augmented reality to a user by executing an augmented reality application using the computing function. The smart phone may additionally have a function of acquiring various information by using various sensors. For example, the smart phone may have GPS to acquire location information.

Further, in the present specification, the smart glasses refer to a wearable computing apparatus having a computing function of, e.g. a processor and a wireless communication function through, e.g., a wireless Internet. The smart glasses may include, for example, eyeglasses and a head mounted display (or a head mount device) (HMD). Similar to the smart phone, the smart glasses may have an image acquisition function and an image display function and provide augmented reality to the user by executing an augmented reality application using the computing function. Further, the smart glasses may have a function of acquiring various information by using various sensors. For example, the smart glasses may have GPS to acquire location information.

In order to provide the augmented reality, a marker may be attached to an object in the real-world environment. In the case where the marker is attached to the object in the real-world environment (hereinafter also referred to as a "marker-based method"), for example, the augmented reality application provides the marker-based augmented reality by identifying the marker of the object in the real-world environment, which is inputted as an image through the user terminal. However, the marker-based method is disadvantageous in that it is limitedly applied to the case where the marker is attached to the object in advance.

In order to provide the augmented reality even in the case where a marker is not attached to an object in the real-world environment (hereinafter also referred to as a "markerless method"), an image of the object in the real-world environment can be used as a marker.

For example, Korean Patent Application Publication No. 10-2015-0093536 (Patent document 1) entitled "Mobile terminal and augmented reality providing method thereof," filed by LG Electronics Co., Ltd. and published on Aug. 18, 2015, discloses a technique of providing augmented reality based on a markerless object. In the technique disclosed in Korean Patent Application Publication No. 10-2015-0093536, a user registers an object in a real-world environment as a markerless object, and also registers virtual information (i.e., an virtual object) corresponding to the markerless object. Accordingly, according to Korean Patent Application Publication No. 10-2015-0093536, it may be disadvantageous in that a user should register the markerless object and the virtual object in advance in order to provide augmented reality.

Further, for example, Korean Patent Application Publication No. 10-2020-0077049 (Patent document 2) entitled "Markerless augmented reality providing apparatus" filed by Korea electronics technology institute and published on Jun. 30, 2020, discloses a technique of identifying an object in a real-world environment and overlapping and displaying a virtual object related to the identified object on a screen in real time. In the technique disclosed in Korean Patent Application Publication No. 10-2020-0077049, the object in the real-world environment is inputted as an image through a user terminal, and feature points of the real-world object are extracted and then compared with feature point of the virtual object that is stored in advance to identify the real-world object. Thus, the virtual object corresponding to the object in the real-world environment may be provided. However, the technique disclosed in Korean Patent Application Publication No. 10-2020-0077049 is premised on being used in a limited environment, such as in the military field. Thus, it may be difficult to apply the above-described technique to general real-world objects.

Meanwhile, in order to provide a video content as a virtual object through augmented reality, the following methods may be considered.

In the case of the marker-based method, the marker attached to the object in the real-world environment may include, for example, a uniform resource identifier (URI) of a video content. The user terminal may provide the video content identified based on the marker. However, according to the marker-based method, only a video content previously designated for the marker may be provided. Further, since the marker-based method cannot be applied to an object to which a marker is not attached, it cannot be generally applied.

In the case of the markerless method, for example, the technique disclosed in Korean Patent Application Publication No. 10-2015-0093536 discloses that a user registers an image of a real-world object as a markerless object and also registers a video content having a uniform resource identifier (URI) that corresponds to the markerless object as a virtual object. Therefore, as described above, it is disadvantageous in that the user has to register the markerless object and the video content (virtual object) in advance. Further, for example, according to the technique disclosed in Korean Patent Application Publication No. 10-2020-0077049, since the virtual object is previously designated for the real-world object, a video content previously designated for the real-world object may be merely provided. Further, since the technique disclosed in Korean Patent Application Publication No. 10-2020-0077049 is applied to the limited environment, it is difficult to be applied to the general environment.

RELATED ART

[Patent Document]
Patent Document 1: Korean Patent Application Publication No. 10-2015-0093536
Patent Document 2: Korean Patent Application Publication No. 10-2020-0077049

SUMMARY

It is an object of the technique of the present disclosure to provide an apparatus of selecting a video content for augmented reality capable of dynamically selecting at least one video content corresponding to an object in a real-world environment and providing a uniform resource identifier for the at least one video content.

It is another object of the technique of the present disclosure to provide a user terminal capable of displaying at least one video content, which is dynamically selected to correspond to an object in a real-world environment, based on a user input to dynamically provide, to a user, the at least one video content to correspond to the real-world object.

It is still another object of the technique of the present disclosure to provide a method of providing a video content for augmented reality. In the method, at least one video content corresponding to an object in a real-world environment is dynamically selected, and the at least one video content is dynamically provided to a user by displaying the at least one video content that corresponds to the real-world object based on a user input.

In view of the above, according to an aspect of the technique of the present disclosure, there is provided an apparatus of selecting a video content for augmented reality, the apparatus including: a communication interface; and an operation processor configured to perform: (a) collecting a plurality of video contents through the Internet; (b) extracting feature information and metadata for each of the plurality of video contents, and generating a hash value corresponding to the feature information by using a predetermined hashing function; (c) managing a database to include at least the hash value and the metadata of each of the plurality of video contents; (d) receiving object information corresponding to an object in a real-world environment from a user terminal through the communication interface; (e) searching the database based on the object information and selecting a video content corresponding to the object information from among the plurality of video contents; and (f) transmitting the metadata of the selected video content to the user terminal through the communication interface.

According to another aspect of the technique of the present disclosure, there is provided a user terminal for augmented reality, including: a communication interface; an image acquisition unit; an image display unit; and an operation processor configured to perform: (a) acquiring an image of a real-world environment by the image acquisition unit; (b) extracting object information corresponding to an object in the real-world environment from the image of the real-world environment; (c) transmitting the object information to a video content selecting apparatus for augmented reality through the communication interface; (d) receiving metadata of a video content from the video content selecting apparatus through the communication interface; (e) displaying at least a part of the metadata of the video content by the image display unit such that the at least the part of the metadata of the video content is superimposed on the object in the real-world environment; and (f) playing the video content based on a user input.

According to still another aspect of the technique of the present disclosure, there is provided a method of providing a video content for augmented reality that is performed by a video content selecting apparatus and a user terminal, the method including: (a) collecting, by the video content selecting apparatus, a plurality of video contents through the Internet; (b) extracting, by the video content selecting apparatus, feature information and metadata for each of the plurality of video contents, and generating a hash value corresponding to the feature information by using a predetermined hashing function; (c) managing, by the video content selecting apparatus, a database to include at least the hash value and the metadata of each of the plurality of video contents; (d) acquiring, by the user terminal, an image of a real-world environment; (e) extracting, by the user terminal, object information corresponding to an object in the real-world environment from the image of the real-world environment; (f) transmitting, by the user terminal, the object information to the video content selecting apparatus; (g) receiving, by the video content selecting apparatus, the object information; (h) selecting, by the video content selecting apparatus, a video content corresponding to the object information from among the plurality of video contents by searching the database based on the object information; (i) transmitting, by the video content selecting apparatus, the metadata of the selected video content to the user terminal; (j) receiving, by the user terminal, the metadata of the selected video content from the video content selecting apparatus; (k) displaying, by the user terminal, at least a part of the metadata of the selected video content such that the at least the part of the metadata of the selected video content is superimposed on the object in the real-world environment; and (l) playing, by the user terminal, the selected video content based on a user input.

According to the technique of the present disclosure, there is provided an apparatus of selecting a video content for augmented reality capable of dynamically selecting at least one video content corresponding to an object in a real-world environment and providing a uniform resource identifier for the at least one video content. The apparatus selects a video content by using a plurality of hash values corresponding to a plurality of key frames, a hash value corresponding to a representative image, one or more hash values corresponding to one or more objects in the plurality of key frames, and one or more hash values corresponding to one or more objects in the representative image. Therefore, it is possible to more easily and accurately select the video content for the augmented reality.

Further, according to the technique of the present disclosure, there is provided a user terminal capable of displaying at least one video content, which is dynamically selected to correspond to an object in a real-world environment, based on a user input to dynamically provide, to a user, the at least one video content to correspond to the real-world object. In particular, a video content that a user may be interested in may be provided through the augmented reality.

Further, according to the technique of the present disclosure, there is provided a method of providing a video content for augmented reality by dynamically selecting at least one video content corresponding to an object in a real-world environment, and dynamically providing the at least one video content to a user by displaying the at least one video content that corresponds to the real-world object based on a user input.

DETAILED DESCRIPTION

Hereinafter, one or more embodiments (also simply referred to as "embodiments") of an apparatus of selecting a video content for augmented reality, a user terminal and a method of providing the video content according to the technique of the present disclosure will be described in detail with reference to the accompanying drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

Embodiment

Figure 1:
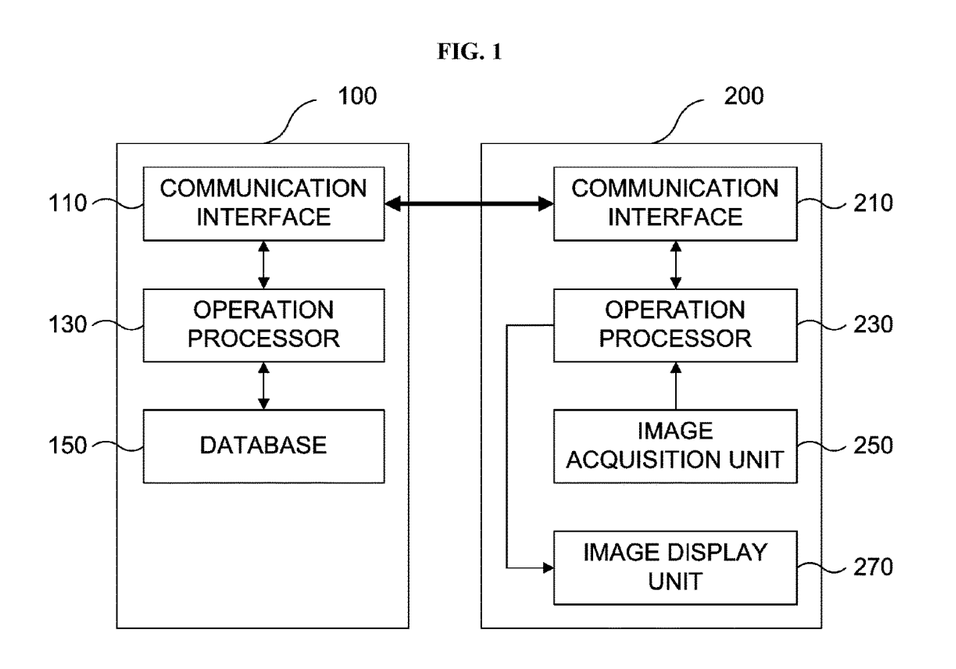
FIG. 1 is a diagram illustrating an exemplary configuration of an apparatus of selecting a video content (hereinafter, referred to as "video content selecting apparatus") and a user terminal for augmented reality according to an embodiment of a technique of the present disclosure.

FIG. 1 is a diagram illustrating an exemplary configuration of an apparatus of selecting a video content (hereinafter, referred to as "video content selecting apparatus") and a user terminal for augmented reality according to an embodiment of the technique of the present disclosure.

Referring to FIG. 1, the video content selecting apparatus 100 for selecting a video content for augmented reality includes a communication interface 110 and an operation processor 130. Further, the video content selecting apparatus 100 may internally include or may be externally connected to a database 150. FIG. 1 illustrates an example in which the video content selecting apparatus 100 internally includes the database 150.

The video content selecting apparatus 100 for the augmented reality according to the embodiment of the technique of the present disclosure may be implemented by using, for example, a computing device such as a personal computer and a dedicated computer.

The communication interface 110 is, for example, an interface for wired/wireless Internet. The communication interface 110 may be implemented by, for example, a semiconductor device such as a communication chip that processes a communication function. The communication interface 110 is configured to communicate with the user terminal 200 and may communicate with a video content providing apparatus (not shown). The video content providing apparatus is, for example, operated by a video content provider such as YouTube, and refers to an apparatus that provides various video contents through a network.

The operation processor 130 is configured to perform various processes according to the embodiment of the technique of the present disclosure. The operation processor 130 may be implemented by, for example, a semiconductor device such as a central processing unit (CPU). The processes performed by the operation processor 130 will be described later.

The database 150 is managed by the operation processor 130. An exemplary configuration of the database 150 will be described later.

Figure 2:
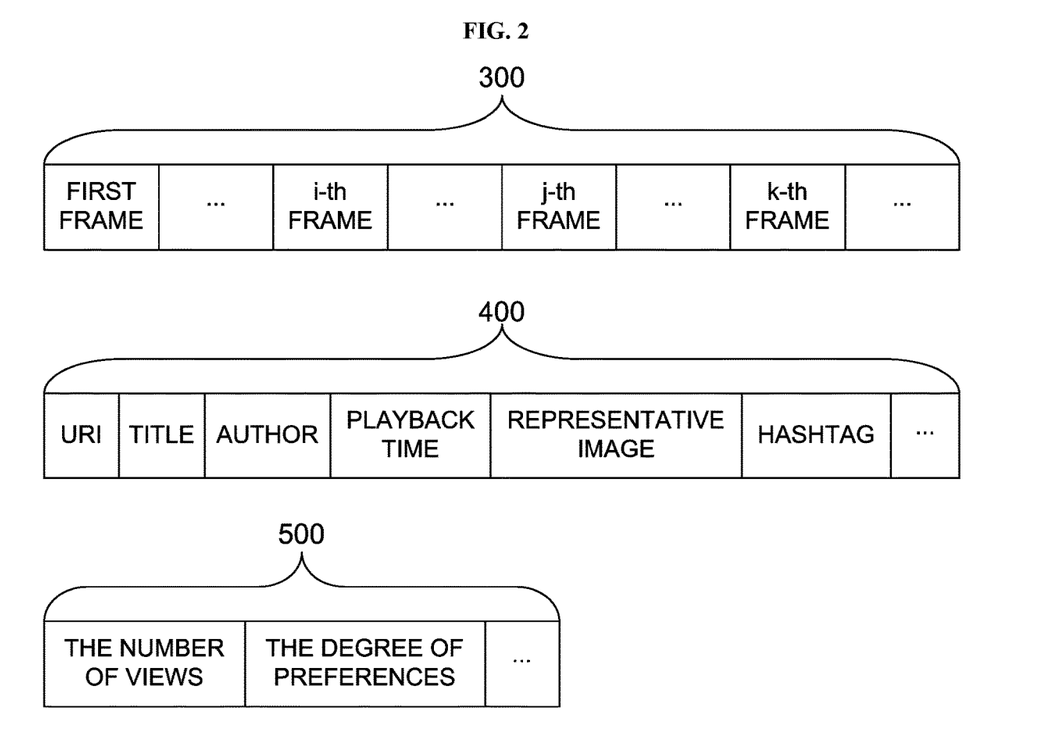
FIG. 2 is a diagram illustrating an example of a structure of the video content, metadata collected in relation to the video content, and information such as the number of views and a degree of preferences of the video content according to the embodiment of the technique of the present disclosure.

FIG. 2 is a diagram illustrating an example of a structure of the video content, metadata collected in relation to the video content, and information such as the number of views and the degree of preferences of the video content according to the embodiment of the technique of the present disclosure.

Referring to FIG. 2, a video content 300 includes a plurality of frames. In the present embodiment, one or more frames, for example, a first frame, an i-th frame, a j-th frame, and a k-th frame (i, j, k are appropriate natural numbers), among the plurality of frames of the video content 300 may be used to extract feature information to be described later.

The metadata 400 of the video content 300 at least includes a uniform resource identifier, and may further include at least one of a title, an author, a playback time, a representative image (e.g., a thumbnail) and a hashtag. The metadata 400 of the video content 300 may be provided by the video content providing apparatus (not shown).

The number of views and the degree of preferences 500 of the video content 300 may be provided by the video content providing apparatus or may be generated and maintained by the video content selecting apparatus 100.

Figure 3:
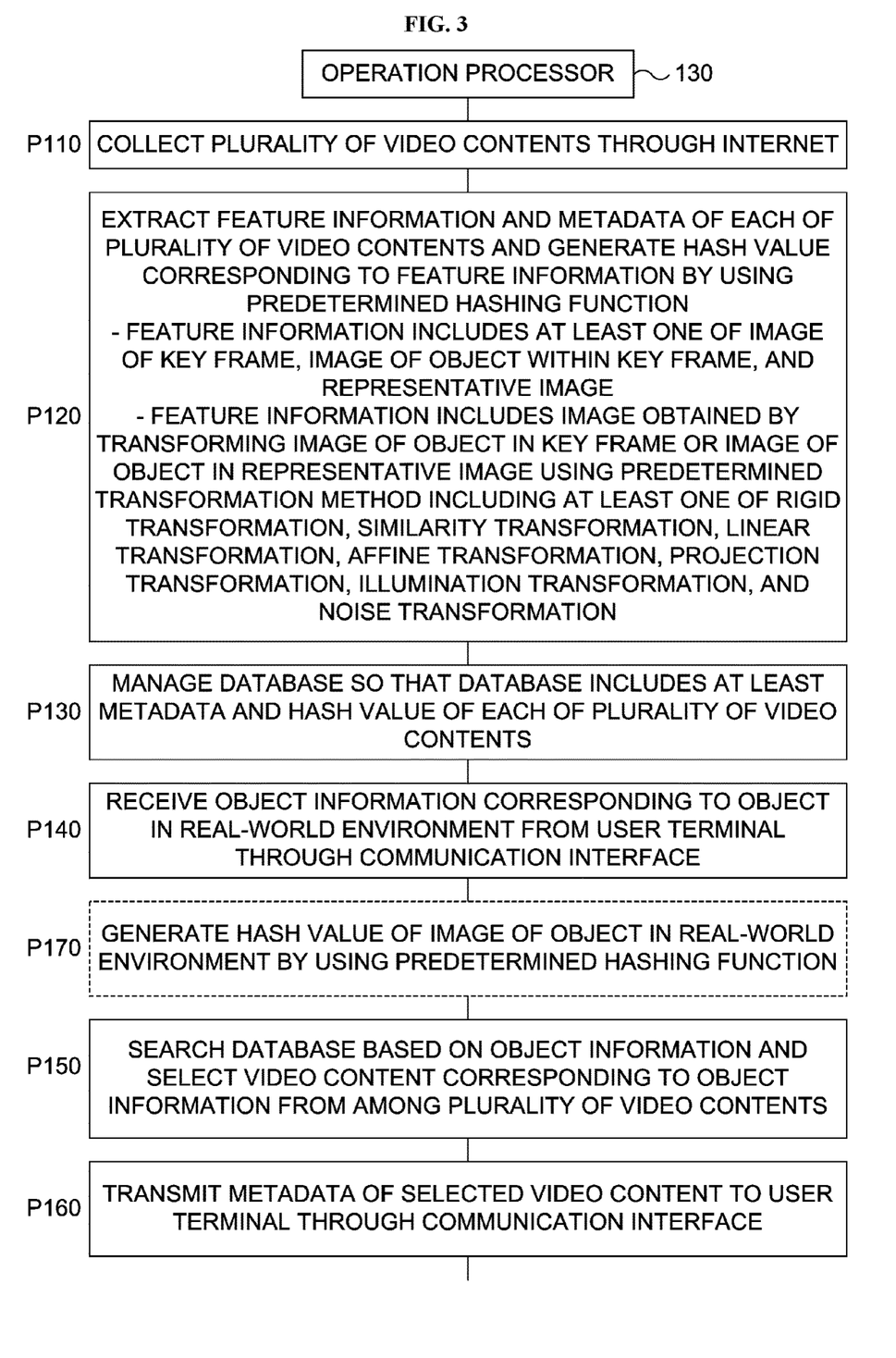
FIG. 3 is a diagram illustrating an example of processes performed by an operation processor of the video content selecting apparatus for the augmented reality according to the embodiment of the technique of the present disclosure.

FIG. 3 is a diagram illustrating an example of processes performed by the operation processor 130 of the video content selecting apparatus 100 for the augmented reality according to the embodiment of the technique of the present disclosure.

Referring to FIG. 3, first, the operation processor 130 performs a process P110 of collecting a plurality of video contents through the Internet. For example, the operation processor 130 may collect the plurality of video contents from the video content providing apparatus (not shown). The operation processor 130 may collect each of the plurality of video contents as a whole. Alternatively, the operation processor 130 may collect a part of each of the plurality of video contents (e.g., a part necessary for extracting feature information to be described later) and metadata of each of the plurality of video contents.

Next, the operation processor 130 performs a process P120 of extracting feature information and metadata of each of the plurality of video contents collected through the process P110, and generating a hash value corresponding to the feature information by using a predetermined hashing function.

The feature information of each of the plurality of video contents may include at least one of an image of a key frame, an image of an object within the key frame, and a representative image (e.g., a thumbnail).

In the process P120, for example, frames such as the first frame, the i-th frame, the j-th frame, and the k-th frame are selected as the key frames from among the plurality of frames of the video content 300 shown in FIG. 2. In other words, a plurality of key frames may be selected, and a hash value may be generated for an image of each of the plurality of key frames.

Further, it is possible to generate a hash value for the image of the object in the key frame. The object in the key frame may be extracted by an image processing using an object detection algorithm, for example, an algorithm such as a region-based convolutional neuron networks (R-CNN), a region-based fully convolutional networks (R-FCN), a single-shot detector (SSD), and a you only look once (YOLO). Extracting an object in the representative image is also performed in a similar way. For example, if multiple objects are present within a specific key frame, a hash value may be generated for an image of each of the multiple objects.

Further, a hash value may be generated for the representative image of the video content 300. For example, if multiple objects are present within the representative image, a hash value may be generated for an image of each of the multiple objects in the representative image.

In addition, the feature information of each of the plurality of video contents may include an image obtained by transforming an image of an object in the key frame or an image of an object in the representative image using a predetermined transformation method. The predetermined transformation method includes at least one of a rigid transformation, a similarity transformation, a linear transformation, an affine transformation, a projection transformation, an illumination transformation, and a noise transformation. A hash value may also be generated for an image transformed using the above-described transformation method.

The above-described transformation method may be used to generate a hash value under normalized conditions for an image of an object in a video content. For example, in a case where an image of an object is affected by the change in illumination, the illumination transformation may be applied to the image of the object to display the image of the object under a specific lighting environment.

As described above, according to the process P120, for example, a plurality of hash values may be generated for one video content. Specifically, a plurality of hash values corresponding to a plurality of key frames, a hash value corresponding to a representative image, one or more hash values corresponding to one or more objects in the plurality of key frames, and one or more hash values corresponding to one or more objects in the representative image may be generated.

In addition, in the process P120, metadata is extracted for each of the plurality of video contents collected through the process P110. As described above, the metadata of each of the plurality of video contents at least includes a uniform resource identifier of each of the plurality of video contents, and may further include at least one of a title, an author, a playback time, a representative image, and a hashtag. The hashtag is a word or phrase preceded by the symbol "#" and is also metadata that is made to facilitate classification and search of video contents.

Next, the operation processor 130 performs a process P130 of managing the database 150 so that the database 150 includes at least metadata and a hash value of each of the plurality of video contents extracted through the process P120.

Figure 4:
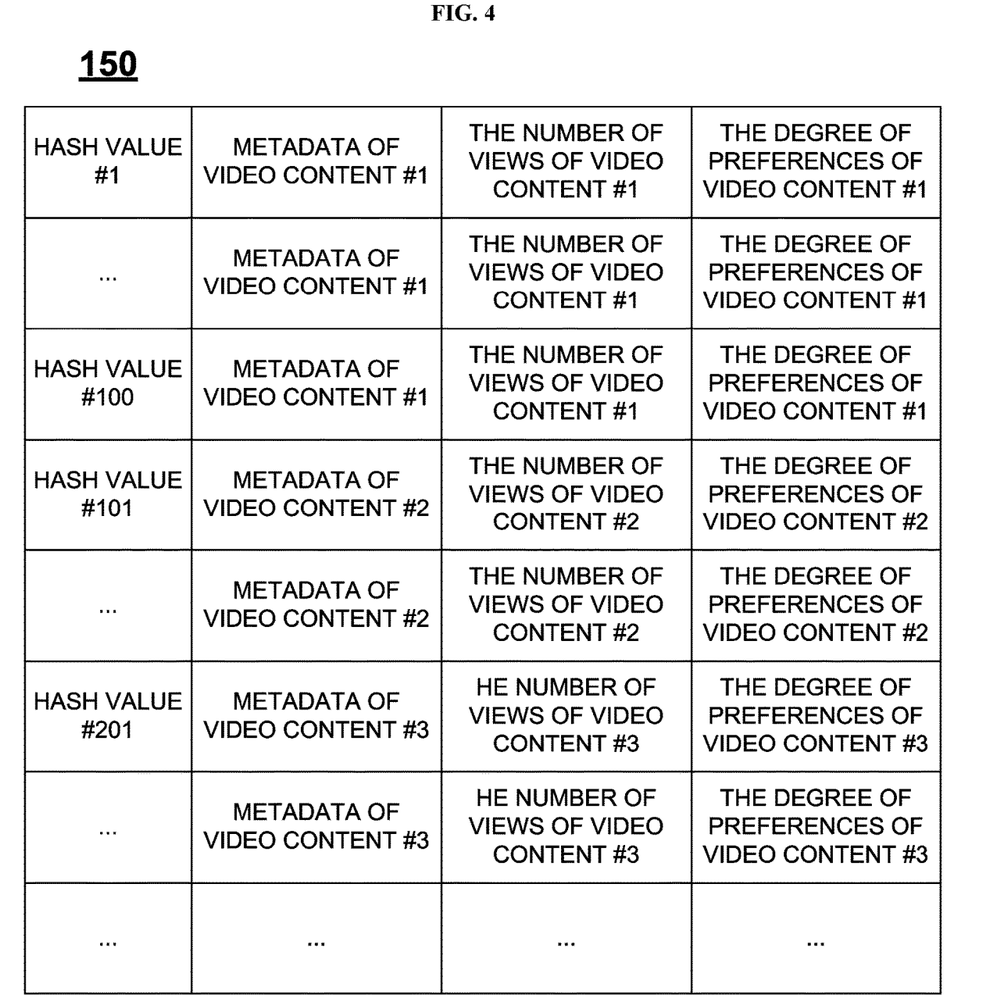
FIG. 4 is a diagram illustrating an exemplary configuration of a database managed by the operation processor of the video content selecting apparatus for the augmented reality according to the embodiment of the technique of the present disclosure.

FIG. 4 is a diagram illustrating an exemplary configuration of the database managed by the operation processor of the video content selecting apparatus for the augmented reality according to the embodiment of the technique of the present disclosure.

Referring to FIG. 4, hash values and metadata are stored and managed in the database 150. Further, information such as the number of views and the degree of preferences may be additionally stored and managed in the database 150. Information in the database 150 may be updated.

For example, a plurality of hash values may be generated for a "video content #1." Specifically, as described above, a "hash value #1" to a "hash value #100" are generated for a plurality of hash values corresponding to a plurality of key frames of the "video content #1," a hash value corresponding to a representative image of the "video content #1," one or more hash values corresponding to one or more objects in the plurality of key frames of the "video content #1," one or more hash values corresponding to one or more objects in the representative image of the "video content #1" and the hash values are stored in the database 150.

Further, metadata is stored for the "video content #1." The metadata at least includes a uniform resource identifier, and may further include other aforementioned information. That is, the same metadata is stored for the "hash value #1" to the "hash value #100." Similarly, the same number of views or the degree of preferences may be stored for the "hash value #1" to the "hash value #100".

Next, the operation processor 130 performs a process P140 of receiving object information corresponding to an object in a real-world environment from the user terminal 200 through the communication interface 110.

The object information may include a hash value of an image of an object in the real-world environment, which is generated by the user terminal 200 using the same hashing function as the predetermined hashing function used in the process P120. A detailed process in which the user terminal 200 generates the hash value of the image of the object in the real-world environment by using the predetermined hashing function will be described later.

The object information may include an image of an object in the real-world environment, which is extracted by the user terminal 200. A detailed process in which the user terminal 200 extracts the image of the object in the real-world environment will also be described later.

Next, the operation processor 130 performs a process P150 of searching the database 150 based on the object information received through the process P140 and selecting a video content corresponding to the object information from among the plurality of video contents.

Figure 5:
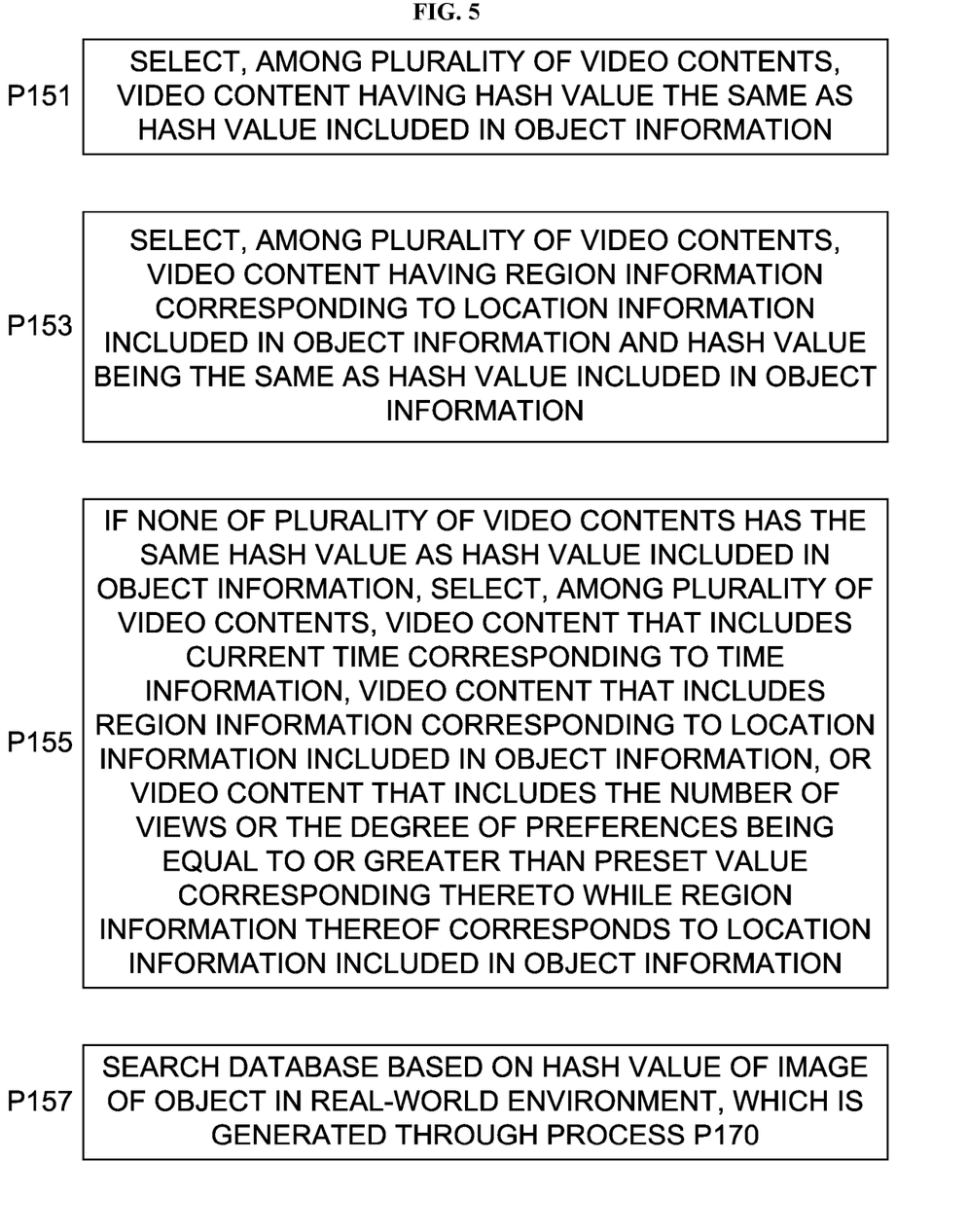
FIG. 5 is a diagram illustrating an example of processes performed by the operation processor of the video content selecting apparatus for the augmented reality to select the video content according to the embodiment of the technique of the present disclosure.

FIG. 5 is a diagram illustrating an example of processes performed by the operation processor of the video content selecting apparatus for the augmented reality to select a video content according to the embodiment of the technique of the present disclosure.

In a case where the object information includes a hash value of the image of the object in the real-world environment, the process P150 may include a process P151 of selecting, among the plurality of video contents, a video content having a hash value the same as the hash value included in the object information.

Specifically, the operation processor 130 compares the hash value received through the process P140 with the hash value stored in the database 150, and selects the video content having the same hash value as the hash value received through the process P140. For example, if the hash value received through the process P140 is the same as the "hash value #1," the operation processor 130 selects the "video content #1" through the process P151.

The object information may further include location information of the user terminal 200, for example, location information extracted through GPS, as well as the hash value of the image of the object in the real-world environment. In addition, the metadata may include a hashtag indicating a uniform resource identifier and region information. For example, hashtags indicating region information are in the form of, for example, "#Seoul" and "#Gangnam." In this case, the process P150 may include a process P153 of selecting, among the plurality of video contents, a video content having the region information corresponding to the location information included in the object information and the hash value being the same as the hash value included in the object information.

For example, the operation processor 130 selects the "video content #2" through the process P153 when the hash value of the object information received through the process P140 is the same as the "hash value #1" and the "hash value #101," and the location information of the object information received through the process P140 corresponds to the region information included in the hashtag of the "video content #2."

In addition, the metadata may include a hashtag indicating at least one of a uniform resource identifier, region information, and time information. The hashtag indicating the time information may be in the form of, for example, "#evening", "#autumn", and "#July." Further, as described above, information such as the number of views and the degree of preferences may be additionally stored and managed in the database 150. In this case, if none of the plurality of video contents has the same hash value as the hash value included in the object information, the process P150 may include a process P155 of selecting, among the plurality of video contents, a video content that includes the current time corresponding to the time information included in the metadata, a video content that includes the region information corresponding to the location information included in the object information, or a video content that includes the number of views or the degree of preferences being equal to or greater than a preset value corresponding to the number of views or the degree of preferences while the region information thereof corresponds to the location information included in the object information.

For example, if none of the plurality of video contents has the same hash value as the hash value included in the object information, the operation processor 130 may select a video content suitable for a hashtag indicating the time information such as "#autumn" or the region information such as "#Gangnam," or select a video content in which the number of views or the degree of preferences is high for the hashtag indicating the region information such as "#Gangnam."

Meanwhile, as described above, the object information received through the process P140 may include an image of an object in the real-world environment instead of a hash value of the image of the object in the real-world environment. In this case, the process P150 may further include a process P157 of searching the database 150 based on a hash value of the image of the object in the real-world environment, which is generated through a process P170 to be described later. Once the hash value of the image of the object in the real-world environment is generated through the process P170, a video content may be selected, for example, in the same manner described in the process P151, the process P153, or the process P155.

Next, the operation processor 130 performs a process P160 of transmitting the metadata of the video content selected in the process P150 to the user terminal 200 through the communication interface 110. That is, the operation processor 130 does not transmit the video content itself, but transmits the metadata (more specifically, the uniform resource identifier) of the video content. The user terminal 200 may receive and provide the video content based on the uniform resource identifier.

Meanwhile, the object information received through the process P140 may include an image of an object in the real-world environment. In this case, as shown in FIG. 3, the operation processor 130 may further perform the process P170 of generating a hash value of the image of the object in the real-world environment by using the predetermined hashing function used in the process P120.

Since the process P170 is substantially the same as the generating of the hash value in the process P120, a detailed description thereof will be omitted. In the process P170, a hash value may also be generated for an image obtained by transforming the image of the object in the real-world environment by using the predetermined transformation method described above.

Next, referring back to FIG. 1, the user terminal 200 includes a communication interface 210, an operation processor 230, an image acquisition unit 250, and an image display unit 270.

The user terminal 200 according to the embodiment of the technique of the present disclosure may be implemented by using, for example, a computing device such as a smart phone and smart glasses.

The communication interface 210 is, for example, an interface for wired/wireless Internet. The communication interface 210 may be implemented by, for example, a semiconductor device such as a communication chip that processes a communication function. The communication interface 210 may be configured to communicate with the video content selecting apparatus 100 for the augmented reality and communicate with the video content providing apparatus (not shown).

The operation processor 230 is configured to perform various processes according to the embodiment of the technique of the present disclosure. The operation processor 230 may be implemented by, for example, a semiconductor device such as a central processing unit (CPU). The processes performed by the operation processor 230 will be described later.

The image acquisition unit 250 includes, for example, one or more cameras and is configured to acquire an image of the real-world environment. The image display unit 270 is, for example, a display of the smart phone, a device configured to display an image on the glass surface of the smart glasses, and the like.

Figure 6:
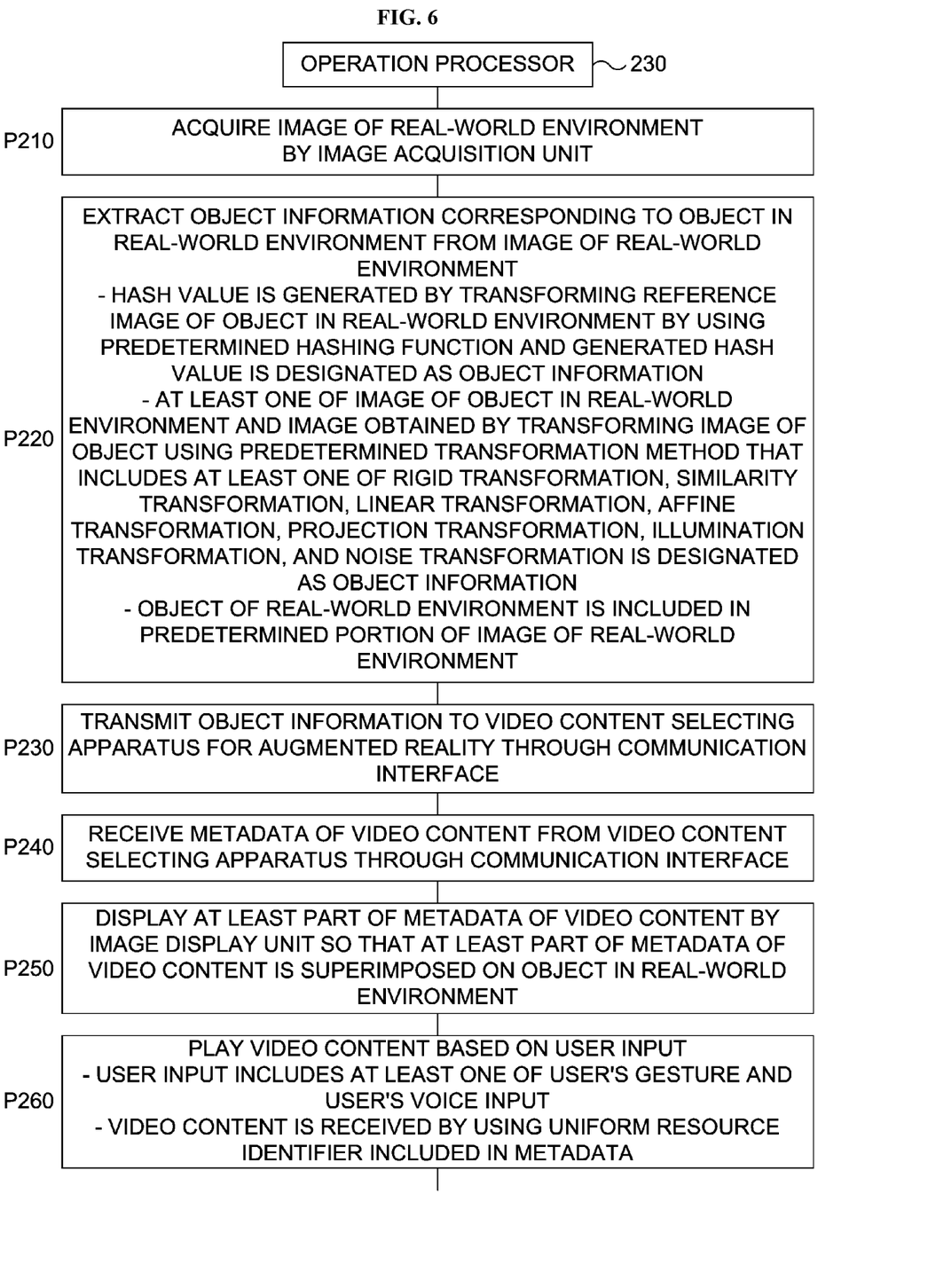
FIG. 6 is a diagram illustrating an example of processes performed by an operation processor of the user terminal according to the embodiment of the technique of the present disclosure.

FIG. 6 is a diagram illustrating an example of processes performed by the operation processor of the user terminal according to the embodiment of the technique of the present disclosure.

Referring to FIG. 6, first, the operation processor 230 performs a process P210 of acquiring an image of the real-world environment by the image acquisition unit 250.

Next, the operation processor 230 performs a process P220 of extracting object information corresponding to an object in the real-world environment from the image of the real-world environment obtained through the process P210. The object(s) in the real-world environment may be extracted by an image processing using the above-described object detection algorithm. The object of the real-world environment may be, for example, included in a predetermined portion of the image of the real-world environment. For example, the object of the real-world environment may be included in a portion where the user may keep an eye on, that is, a central portion and a peripheral portion of the central portion in the image of the real-world environment.

The process P220 may include a process of generating a hash value by transforming a reference image of the object in the real-world environment by using the same hashing function as the predetermined hashing function used in the process P120 and designating the generated hash value as the object information. The generating of the hash value by transforming the reference image of the object in the real-world environment is substantially the same as the generating of the hash value of the image of the object in the process P120, and thus a detailed description thereof will be omitted.

Similar to the feature information in the process P120, the reference image of the object in the real-world environment may include at least one of an image of the object in the real-world environment and an image obtained by transforming the image of the object using a predetermined transformation method that includes at least one of the rigid transformation, the similarity transformation, the linear transformation, the affine transformation, the projection transformation, the illumination transformation, and the noise transformation. Therefore, a detailed description of the reference image of the object in the real-world environment will be omitted.

The process P220 may include a process of designating, as object information, at least one of the image of the object in the real-world environment and the image obtained by transforming the image of the object using the predetermined transformation method that includes at least one of the rigid transformation, the similarity transformation, the linear transformation, the affine transformation, the projection transformation, the illumination transformation, and the noise transformation. In other words, the object information may include an image instead of a hash value. Accordingly, the video content selecting apparatus 100 for the augmented reality may select a video content based on the image included in the object information.

Meanwhile, the object information may further include location information. That is, the object information may further include location information extracted through the GPS of the user terminal 200. The object information may be used in selecting the video content in the process P153 or process P155.

Next, the operation processor 230 performs a process P230 of transmitting the object information extracted through the process P220 to the video content selecting apparatus 100 for the augmented reality through the communication interface 210.

Next, the operation processor 230 performs a process P240 of receiving the metadata of the video content from the video content selecting apparatus 100 for the augmented reality through the communication interface 210.

Next, the operation processor 230 performs a process P250 of displaying at least a part of the metadata of the video content by the image display unit 270 so that at least the part of the metadata of the video content received through the process P240 is superimposed (overlaid) on the object in the real-world environment.

Figure 7:
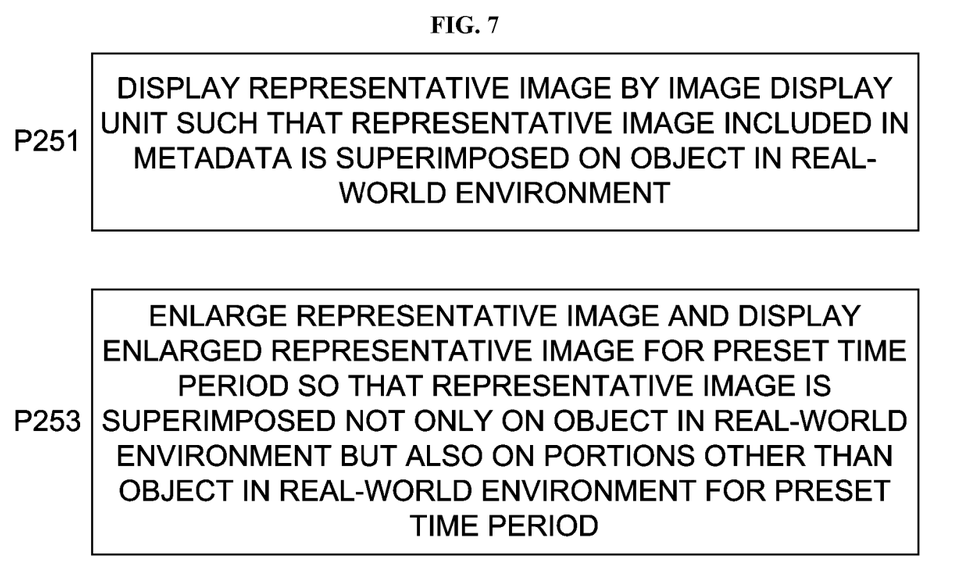
FIG. 7 is a diagram illustrating an example of processes performed by the operation processor of the user terminal to display at least a part of metadata of the video content according to the embodiment of the technique of the present disclosure.

FIG. 7 is a diagram illustrating an example of processes performed by the operation processor of the user terminal to display at least the part of the metadata of the video content according to the embodiment of the technique of the present disclosure.

Referring to FIG. 7, the process P250 may include a process P251 of displaying the representative image by the image display unit 270 such that the representative image included in the metadata is superimposed on the object in the real-world environment. In the case of the smart phone, a synthesized image, in which the representative image included in the metadata is superimposed on the object in the real-world environment, is displayed on a display. In the case of the smart glasses, an image, in which the representative image included in the metadata is superimposed on the object in the real-world environment, is projected onto, for example, the glass surface of the smart glasses so that the user's eyes can see the image.

Further, the process P250 may include a process P253 of enlarging the representative image and displaying the enlarged representative image for a preset time period so that the representative image is superimposed not only on the object in the real-world environment but also on portions other than the object in the real-world environment for the preset time period. That is, the operation processor 230 may enlarge the representative image and display the enlarged representative image in order to more clearly display the representative image to the user.

Next, the operation processor 230 performs a process P260 of playing the video content based on a user input.

The user input may include an input such as a gesture input and a voice input of the user of the user terminal 200. In the case of the smart phone, the user input may include a user's touch input.

In the process P260, the video content may be received by using the uniform resource identifier included in the metadata. That is, the user terminal 200 may use the uniform resource identifier to access the video content providing apparatus (not shown) and receive the video content from the video content providing apparatus.

Referring to FIG. 6, the operation processor 230 may be configured to perform the process P220 when an object in the real-world environment is included in the image of the real-world environment obtained through the process P210 for a predetermined time period or longer. For example, when an object in the real-world environment is included in the image of the real-world environment obtained through the process P210 for 1 second or longer, it may be determined that the user is interested in the object. Accordingly, when the object in the real-world environment is included in the image of the real-world environment obtained through the process P210 for a predetermined time period or longer, it is preferable to perform the process P220.

Other Embodiments

While the technique of the present disclosure is described in detail by way of the embodiments described above, the technique of the present disclosure is not limited thereto and may be modified in various ways without departing from the scope thereof.

For example, the technique of the present disclosure may also be applied to a video content selecting method for augmented reality.

The video content selecting method for the augmented reality according to the technique of the present disclosure may include: (a) collecting a plurality of video contents through the Internet; (b) extracting feature information and metadata for each of the plurality of video contents, and generating a hash value corresponding to the feature information by using a predetermined hashing function; (c) managing a database to include at least the hash value and the metadata of each of the plurality of video contents; (d) receiving object information corresponding to an object in a real-world environment from a user terminal through a communication interface; (e) searching the database based on the object information and selecting a video content corresponding to the object information from among the plurality of video contents; and (f) transmitting the metadata of the selected video content to the user terminal through the communication interface.

For example, the technique of the present disclosure may also be applied to a video content providing method for augmented reality.

The video content providing method for the augmented reality according to the technique of the present disclosure may include: (a) acquiring an image of a real-world environment by an image acquisition unit; (b) extracting object information corresponding to an object in the real-world environment from the image of the real-world environment; (c) transmitting the object information to a video content selecting apparatus for the augmented reality through a communication interface; (d) receiving metadata of a video content from the video content selecting apparatus through the communication interface; (e) displaying at least a part of the metadata of the video content by an image display unit such that the at least the part of the metadata of the video content is superimposed on the object in the real-world environment; and (f) playing the video content based on a user input.

Further, according to the technique of the present disclosure, there may be provided a method of providing a video content for augmented reality, which is performed by a video content selecting apparatus and a user terminal. The method may include (a) collecting, by the video content selecting apparatus, a plurality of video contents through the Internet; (b) extracting, by the video content selecting apparatus, feature information and metadata for each of the plurality of video contents, and generating a hash value corresponding to the feature information by using a predetermined hashing function; (c) managing, by the video content selecting apparatus, a database to include at least the hash value and the metadata of each of the plurality of video contents; (d) acquiring, by the user terminal, an image of a real-world environment; (e) extracting, by the user terminal, object information corresponding to an object in the real-world environment from the image of the real-world environment; (f) transmitting, by the user terminal, the object information to the video content selecting apparatus; (g) receiving, by the video content selecting apparatus, the object information; (h) selecting, by the video content selecting apparatus, a video content corresponding to the object information from among the plurality of video contents by searching the database based on the object information; (i) transmitting, by the video content selecting apparatus, the metadata of the selected video content to the user terminal; (j) receiving, by the user terminal, the metadata of the selected video content from the video content selecting apparatus; (k) displaying, by the user terminal, at least a part of the metadata of the selected video content such that the at least the part of the metadata of the selected video content is superimposed on the object in the real-world environment; and (l) playing, by the user terminal, the selected video content based on a user input.

Specific technical features of the video content selecting method and the video content providing method according to the technique of the present disclosure are substantially the same as the features of the video content selecting apparatus for the augmented reality and the user terminal according to the above-described embodiment. Accordingly, detailed descriptions of the video content selecting method and the video content providing method according to the technique of the present disclosure will be omitted.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to some embodiments of the technique of the present disclosure, it is possible to provide an apparatus of selecting a video content for augmented reality capable of dynamically selecting at least one video content corresponding to an object in a real-world environment and providing a uniform resource identifier for the at least one video content. The apparatus selects a video content by using a plurality of hash values corresponding to a plurality of key frames, a hash value corresponding to a representative image, one or more hash values corresponding to one or more objects in the plurality of key frames, and one or more hash values corresponding to one or more objects in the representative image. Therefore, it is possible to more easily and accurately select the video content for the augmented reality.

Further, according to some embodiments of the technique of the present disclosure, it is possible to provide a user terminal capable of displaying at least one video content, which is dynamically selected to correspond to an object in a real-world environment, based on a user input to dynamically provide, to a user, the at least one video content to correspond to the real-world object. In particular, a video content that a user may be interested in may be provided through the augmented reality.

Further, according to some embodiments of the technique of the present disclosure, it is possible to provide a method of providing a video content for augmented reality by dynamically selecting at least one video content corresponding to an object in a real-world environment, and dynamically providing the at least one video content to a user by displaying the at least one video content that corresponds to the real-world object based on a user input.

What is claimed is:

1. An apparatus for selecting video content for augmented reality, the apparatus comprising:
    a communication interface; and
    an operation processor configured to perform:
    (a) collecting a plurality of video contents through the Internet;
    (b) extracting feature information and metadata for each of the plurality of video contents, and generating a hash value corresponding to the feature information by using a predetermined hashing function;
    (c) managing a database to include at least the hash value and the metadata of each of the plurality of video contents;
    (d) receiving object information corresponding to an object in a real-world environment from a user terminal through the communication interface;
    (e) searching the database based on the object information and selecting the video content corresponding to the object information from among the plurality of video contents; and
    (f) transmitting the metadata of the video content to the user terminal through the communication interface,
    wherein the metadata of each of the plurality of video contents includes a hashtag indicating a uniform resource identifier and region information,
    wherein the object information includes a hash value of an image of the object in the real-world environment and location information of the user terminal, the hash value included in the object information being generated using the predetermined hashing function, and
    wherein (e) further comprises: selecting the video content with region information corresponding to the location information included in the object information and with a hash value same as the hash value included in the object information, from among the plurality of video contents.

2. The apparatus of claim 1, wherein the feature information of each of the plurality of video contents includes at least one of: an image of a key frame, an image of an object in the key frame, or a thumbnail.

3. The apparatus of claim 1, wherein the feature information of each of the plurality of video contents includes an image obtained by transforming an image of an object in a key frame or an image of an object in a thumbnail using a predetermined transformation method that includes at least one of: a rigid transformation, a similarity transformation, a linear transformation, an affine transformation, a projection transformation, an illumination transformation, or a noise transformation.

4. The apparatus of claim 1, wherein the metadata of each of the plurality of video contents includes at least the uniform resource identifier, and wherein the metadata of each of the plurality of video contents further includes at least one of a title, an author, a playback time, or a thumbnail.

5. The apparatus of claim 1, wherein the object information includes the image of the object in the real-world environment,
    wherein the operation processor is further configured to perform:
    (g) generating a hash value of the image of the object in the real-world environment by using the predetermined hashing function, and wherein (e) further comprises: searching the database based on the hash value of the image of the object in the real-world environment, which is generated in (g).

6. An apparatus for selecting video content for augmented reality, the apparatus comprising:
    a communication interface; and
    an operation processor configured to perform:
    (a) collecting a plurality of video contents through the Internet;
    (b) extracting feature information and metadata for each of the plurality of video contents, and generating a hash value corresponding to the feature information by using a predetermined hashing function;
    (c) managing a database to include at least the hash value and the metadata of each of the plurality of video contents;
    (d) receiving object information corresponding to an object in a real-world environment from a user terminal through the communication interface;
    (e) searching the database based on the object information and selecting the video content corresponding to the object information from among the plurality of video contents; and
    (f) transmitting the metadata of the video content to the user terminal through the communication interface,
    wherein the metadata of each of the plurality of video contents includes a hashtag indicating at least one of a uniform resource identifier, region information, or time information,
    wherein the database further includes at least one of a number of views or a degree of preferences of each of the plurality of video contents,
    wherein the object information includes a hash value of an image of the object in the real-world environment and location information of the user terminal, the hash value included in the object information being generated using the predetermined hashing function, and
    wherein (e) further comprises: if none of the plurality of video contents has the same hash value as the hash value included in the object information, selecting from among the plurality of video contents, the video content whose current time or region information corresponds to the time information or the location information included in the object information or whose number of views or degree of preferences is equal to or greater than a preset value while the region information of the video content corresponds to the location information included in the object information.

7. A user terminal for augmented reality, comprising:
    a communication interface;
    an image acquisition unit;
    an image display unit; and
    an operation processor configured to perform:
    (a) acquiring an image of a real-world environment by the image acquisition unit;
    (b) extracting object information corresponding to an object in the real-world environment from the image of the real-world environment;
    (c) transmitting the object information to a video content selecting apparatus for augmented reality through the communication interface;
    (d) receiving metadata of a video content from the video content selecting apparatus through the communication interface;
    (e) displaying at least a part of the metadata of the video content by the image display unit such that the at least the part of the metadata of the video content is superimposed on the object in the real-world environment; and (f) playing the video content based on a user input, wherein (e) further comprises: displaying a thumbnail by the image display unit such that the thumbnail included in the metadata is superimposed on the object in the real-world environment, wherein (e) further comprises: enlarging the thumbnail and displaying the thumbnail for a preset time period such that the thumbnail is superimposed not only on the object in the real-world environment but also on portions other than the object in the real-world environment for the preset time period.

8. The user terminal of claim 5, wherein (b) is performed when the object in the real-world environment is included in the image of the real-world environment for a predetermined time period or longer.

9. The user terminal of claim 7, wherein the object is included in a predetermined portion of the image of the real-world environment.

10. The user terminal of claim 7, wherein (b) further comprises: generating a hash value by transforming a reference image of the object in the real-world environment by using a predetermined hashing function, and designating the hash value as the object information.

11. The user terminal of claim 10, wherein the reference image of the object includes at least one of an image of the object in the real-world environment or an image obtained by using a predetermined transformation method that includes at least one of a rigid transformation, a similarity transformation, a linear transformation, an affine transformation, a projection transformation, an illumination transformation, or a noise transformation.

12. The user terminal of claim 5, wherein the object information further includes location information.

13. The user terminal of claim 5, wherein (b) further comprises: designating as the object information at least one of an image of the object in the real-world environment or an image obtained by transforming the image of the object using a predetermined transformation method, wherein the predetermined transformation method includes at least one of a rigid transformation, a similarity transformation, a linear transformation, an affine transformation, a projection transformation, an illumination transformation, or a noise transformation.

14. The user terminal of claim 7, wherein the user input includes at least one of a user's gesture or the user's voice input, and wherein, in (f), the video content is received by using a uniform resource identifier included in the metadata.

* * * * *